Oct. 10, 1961 W. J. HILL 3,003,836
ROLL ADJUSTMENT
Filed Oct. 22, 1958 2 Sheets-Sheet 1

INVENTOR.
William J. Hill
BY
Norman S. Blodgett
Attorney

INVENTOR.
William J. Hill
BY Norman S. Blodgett
Attorney

United States Patent Office 3,003,836
Patented Oct. 10, 1961

3,003,836
ROLL ADJUSTMENT
William J. Hill, Worcester, Mass., assignor to Morgan Construction Company, Worcester, Mass., a corporation of Massachusetts
Filed Oct. 22, 1958, Ser. No. 768,983
7 Claims. (Cl. 308—234)

This invention relates to a bearing apparatus and more particularly to a bearing apparatus arranged to permit the axial adjustment of a roll of a rolling mill.

In the operation of a rolling mill it is very often necessary to make an axial adjustment of one roll relative to another. This may be necessary to align the roll grooves in order to permit proper rolling of the rod or bar passing through the mill. One of the satisfactory methods for accomplishing this adjustment is shown in the patent to Morgan #2,184,463. Most of the devices used in the past to accomplish this function, however, have suffered from defects which have made them less than entirely satisfactory. For instance, in the operation of the roll alignment device shown in the Morgan patent, the operator sometimes attempts the actuation of the roll screw-downs to produce vertical motion (in the case of a horizontal mill) without unclamping the device. This produces stresses in the roll bearing and in the related parts of the mill. At other times the operator may tighten up the aligning device too tightly thus producing binding in the roll bearing and failure thereof. These and other difficulties experienced with the prior art devices have been obviated in a novel manner by the present invention.

It is, therefore, an outstanding object of the present invention to provide a roll adjustment which is simple and inexpensive to manufacture and which is capable of a long life of useful service with a minimum of maintenance.

It is a further object of this invention to provide a roll alignment apparatus which is incapable of improper use by the rolling mill operator.

Another object of the present invention is the provision of a roll adjustment means which cannot be operated to produce stresses in the bearing and on the roll.

Another object of the invention is the provision of a roll adjustment for use with an oil film bearing having an outboard thrust element which not only will adjust the axial position of the roll but will produce the proper loading in the thrust bearing.

It is a still further object of the instant invention to provide a roll adjustment which will remove any backlash from the roll bearing and supports.

It is another object of the invention to provide a roll adjustment which, while maintaining the roll axial position, will permit operation of the roll screwdowns.

Another object of the invention is the provision of a roll adjustment operating through an outboard thrust bearing in which the thrust bearing is substantially free of radial forces even when the roll screwdowns are operated without loosening the roll adjustment.

Another object of the invention is the provision of a roll adjustment which can be used on the upper end of the rolls of a vertical rolling mill, wherein the adjustment can be effected easily from the mill floor and the operator is not required to climb to the top of the mill to make the adjustment.

It is a still further object of the present invention to provide a roll adjustment which is compact and which may be entirely and easily removed with the roll bearing.

Another object of the invention is the provision of a roll adjustment which, because of the absence of protruding elements, adds to the safety of the rolling mill and to its aesthetic appearance.

A still further object of the invention is the provision of an axial roll adjustment in which all of the elements operate in an enclosed oil-lubricated housing and provide a more accurate adjustment of the roll.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which.

Figure 1:
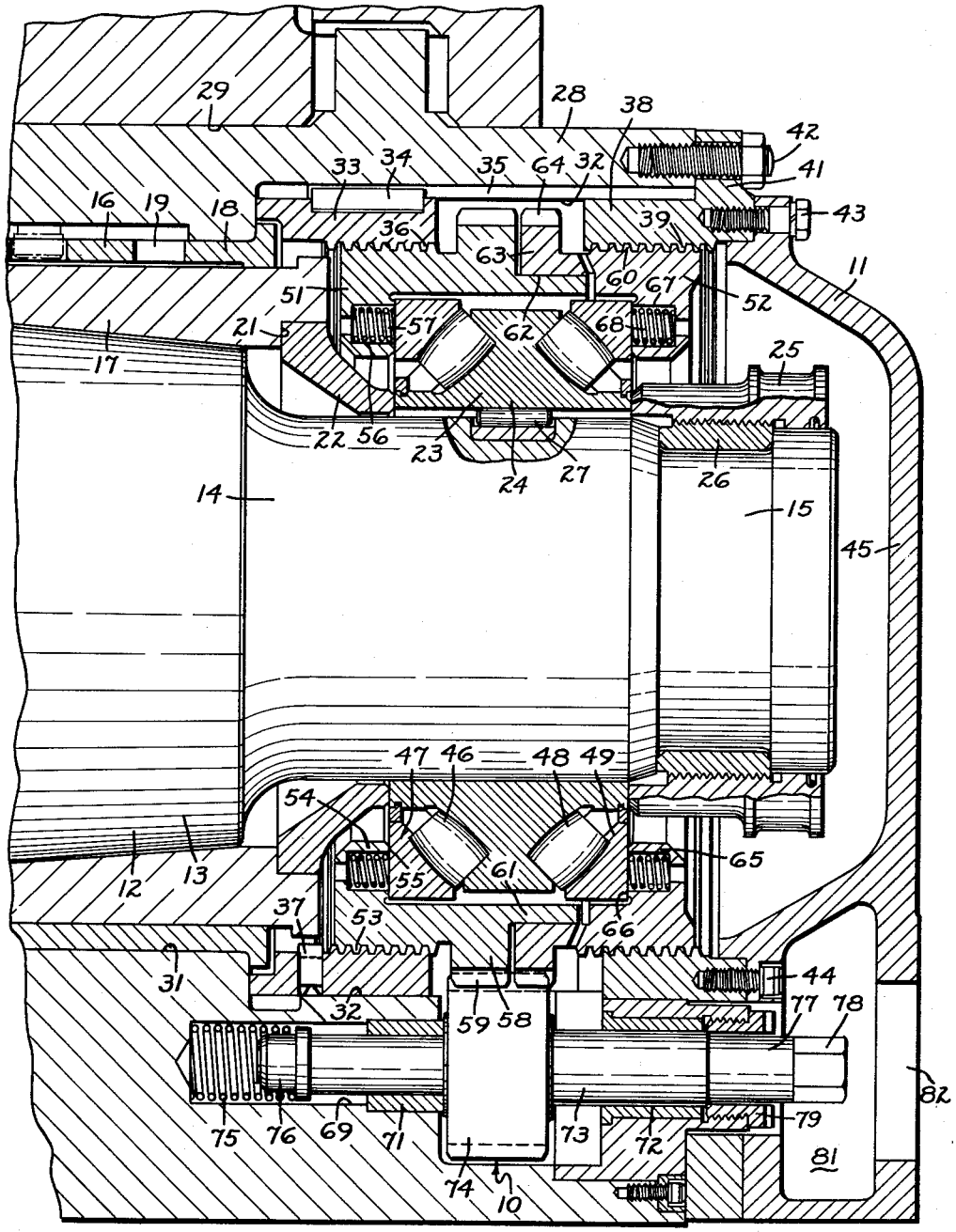
FIG. 1 is a horizontal sectional view of apparatus embodying the principles of the present invention.

Referring first to FIG. 1, wherein are best shown the general features of the invention, the roll adjustment, indicated generally by the reference numeral 10, is shown in use in a rolling mill 11 having a roll 12. The roll 12 is of a conventional type having a tapered neck 13 adjacent the barrel, not shown, and a somewhat reduced cylindrical nut 14 having an annular groove 15 adjacent its outer end. The roll is mounted in an oil film bearing 16 of the type shown and described in the patent to Dahlstrom #2,018,055, which bearing has a sleeve 17 with a tapered inner bore to fit on the tapered neck 13 of the roll and surrounded by a bushing 18, the bushing and sleeve having mating cylindrical surfaces with the usual bearing clearance. Oil is supplied between the sleeve and bushing through ports 19 in the usual way to provide for hydrodynamic lubrication to resist the separating forces on the roll during rolling.

The outboard end of the sleeve 17 is provided with an annular recess 21 receiving one end of an annular ring 22. Contacting the outboard end of the ring 22 and mounted on the cylindrical neck 14 of the roll is the inner race 23 of a roller thrust bearing 24. Contacting the outer end of the inner race 23 is a locking nut 25 threadedly engaging a split threaded ring 26 snugly fitted in the groove 15 of the roll. A key 27 locks the inner race 23 of the thrust bearing 24 against rotation relative to the roll.

The oil film bearing 16 is mounted in a chock 28 which, in turn, is mounted in the window 29 of the rolling mill 11; for the purpose of illustration, the rolling mill 11 is shown as being a horizontal mill with horizontal roll axes and, therefore, the surfaces of the window 29 are vertical and the chock 28 is capable of vertical movement in the window on occasion. It will be understood, of course, that the chock 28 is incapable of horizontal movement in any direction relative to the rolling mill housing. The chock is provided with a bore 31 to receive the sleeve 18 tightly and this bore is enlarged at the outer end to provide an outboard counterbore 32. Mounted in the counterbore 32 adjacent the bearing 16 is a first adjusting member 33 which is locked against rotation relative to the bore 32 by means of a key 34 slidable in an axial keyway 35 formed in the bore 32. The first adjusting member is provided with internal threads 36 capable of withstanding fairly large axial forces. A stop pin 37 extends inwardly of the first adjusting member, at least as far as the innermost extent of the threads 36, this pin being located adjacent the outboard end of the sleeve 17. At the outboard end of the counterbore 32 is located a second adjusting member 38 having internal threads 39 of the same pitch and strength as the threads 36 associated with the first adjusting member 33. The radial flange 41 extends outwardly from the second adjusting member 38, contacts the outboard end of the chock 28, and is fastened thereto by means of a stud-and-nut arrangement 42. Fastened to the second adjusting member 38 by means of bolts 43 and 44 is a cover 45 which will be described more fully hereinafter.

The inner race 23 of the roller thrust bearing 24 is provided on one side with a row of rollers 46 which is adapted to receive inwardly directed thrust forces and which is associated with an outer race 47 of the bearing 24 and on the other side with a row of rollers 48 which is adapted to receive outwardly directed thrust forces and which is associated with an outer race 49 of the bearing 24. Residing in the space defined by the first and second adjusting members 33 and 38, the sleeve 17, and the cover 45 are a third adjusting member 51 and a fourth adjusting member 52. The third adjusting member 51 is provided with external threads 53 adapted to engage the threads 36 associated with the first adjusting means 33. A radial flange 54 extends inwardly of the third adjusting member and is provided with a suitably relieved radial surface 55 which contacts a similar radial surface on the outer race 47 of the thrust bearing. Extending inwardly of the surface 55 are bores 56 carrying coil springs 57 which also press against the radial surface of the outer race 47. At the outboard end of the third adjusting member 51 is an outwardly extending radial flange 58 whose outer surface is provided with gear teeth 59. The third adjusting member is provided with an axially extending tubular portion 61 having external cylindrical surface which is slidably fitted in a bore 62 in the adjacent end of the fourth adjusting member 52; the same end of the fourth adjusting member is provided with an outwardly extending radial flange 63 having on its outer surface gear teeth 64, the gear teeth 59 associated with the flange 58 and the gear teeth 64 associated with the flange 63 having the same pitch and pitch circle. The fourth adjusting means 52 is also provided with external threads 60 adapted to engage the internal threads 39 of the second adjusting member 38. Furthermore, the fourth adjusting member is provided with an inwardly directed radial flange 65 having a smooth radial surface 66 engaging a similar outwardly directed surface on the outer race 49 of the thrust bearing; this flange is also provided with a series of bores 67 in which reside coil springs 68 which press against the radial surface of the outer race 49. Extending radially into the chock 28 is a bore 69 carrying spaced bushings 71 and 72 which support a stub shaft 73. To the center portion of the shaft 73 between the bushings 71 and 72 is fastened a gear 74 adapted to mesh with the gear teeth 59 and 64 which is associated with the third and fourth adjusting members 51 and 52, respectively. Lying in the inner end of the bore 69 is a coil spring 75 which contacts a hardened metal ferrule 76 fastened to a reduced end of the shaft 73, the ferrule being provided with a reduced portion which fits within the coil spring 75 and with a radial portion which contacts the end of the spring. At its outboard end the shaft 73 is provided with a reduced portion 77 terminating in a hexagonal actuating surface 78. Snugly fitted around the reduced portion 77 is a lock nut 79 having external threads which engage similar threads formed on the inner surface of the bore 69; the lock nut 79 is suitably provided with external slots for engagement by a suitable tool for its rotation. The cover 45 is provided with a chamber 81 which surrounds the entrance to the bore 69 and the equipment associated therewith and within an aperture 82 which extends through the wall of the housing into the chamber to provide for the admission of wrenches and the like.

The operation of the apparatus will now be readily understood in view of the above description. With the mechanism in the condition shown in FIG. 1, it is only necessary in order to produce axial adjustment of the roll 12 to place a wrench on the hexagonal surface 78 of the stub shaft 73. Rotation of the wrench and the stub shaft produces a similar and simultaneous rotation of the third adjusting member 51 and the fourth adjusting member 52, because of the engagement of the teeth of the gear 74 with the teeth 59 and 64 of the adjusting members. Since the first adjusting member 33 and the second adjusting member 38 are immovably fixed to the chock 28, the rotation of the third and fourth adjusting members causes them to move axially because of the threaded engagement between the first and third adjusting members and between the second and fourth adjusting members. Depending upon the direction of rotation, the roll will be moved axially in one direction. The third and fourth adjusting members 51 and 52 carry the roller thrust bearing 24 with them in their simultaneous movement; the thrust bearing is, of course, locked to the roll because of the ring 22 and the locking nut 25. The use of the thrust bearing in the adjusting means does not prevent it from functioning as a thrust bearing in the manner for which it was designed. Furthermore, no amount of axial thrust acting through the thrust bearing on the third and fourth adjusting members will cause accidental axial motion of the roll relative to the mill housing.

Figure 2:
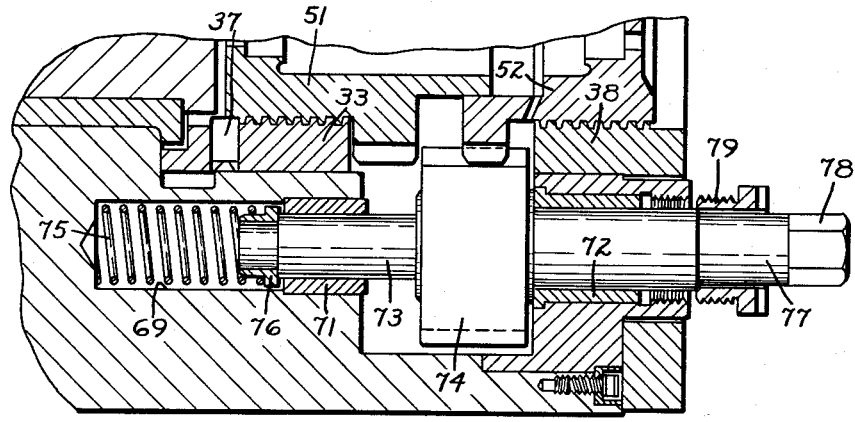
FIG. 2 is a sectional view of the apparatus shown in a different condition of the elements.

The initial assembly and adjustment of the elements of the invention are of interest. The chock 28, oil film bearing 16, the thrust bearing 24, and the first, second, third and fourth adjusting members are all assembled on the roll neck previous to its being placed in the mill and are locked in place by means of the locking nut 25. When the roll and the assembly attached thereto is placed in the chock and the chock is placed in the rolling mill housing with the jackshaft and its associated equipment in place, the third adjusting means 51 is rotated so that it moves axially and strikes the pin 37 in the manner shown in FIG. 2. With the lock nut 79 disengaged from the threaded bore 69 the jackshaft is moved to the right under the action of the coil spring 75 so that it does not engage the third adjusting member 51 but the teeth of its gear 74 engage only the teeth 64 of the fourth adjusting member 52. By moving the fourth adjusting member 52 axially it is possible to produce exactly the desired amount of pressure on the outer races 47 and 49 of the roller thrust bearing 24 by the radial surface 55 of the third adjusting member 54 and the radial surface 66 of the fourth adjusting member 52. Once this pressure has been adjusted properly, the jackshaft is moved to the left so that it engages both teeth in the manner shown in FIG. 1 and the lock nut 79 is screwed into place and tightened to maintain the jackshaft in this position. With the cover 45 in place it can be seen that the apparatus is entirely enclosed in a housing formed by the cover 45 and the chock 28, this housing being air tight and well lubricated.

Figure 3:
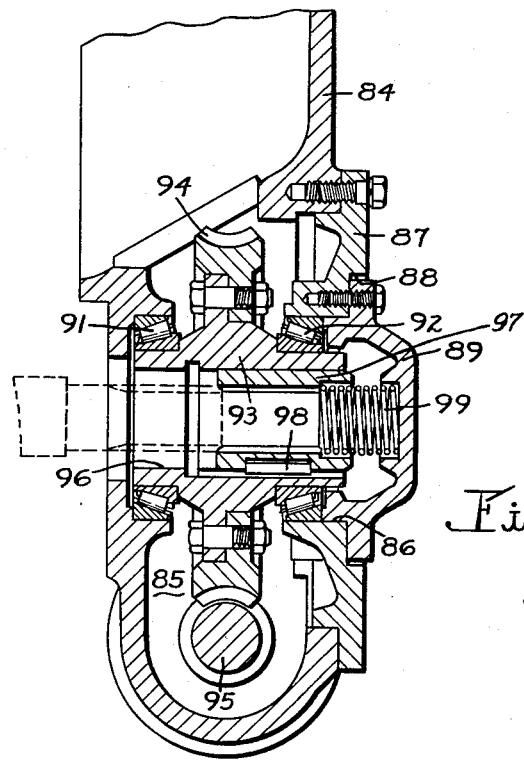
FIG. 3 is a horizontal sectional view of an attachment for use with the apparatus.

In FIG. 3 is shown a modification of the invention which permits the actuation of the adjustment from unusual positions. For instance, this modification is particularly useful when the axial adjustment is used on a vertical rolling mill and it is desired to adjust the rolls from the operating floor rather than have an operator climb on top of the roll. The cover 84 which is situated in a manner similar to the cover 45 is provided with a chamber 85 having an aperture 86 entering therein. A closure 87 is mounted over the aperture and is provided with an aperture 88 in which is mounted a cap 89. Roller bearings 91 and 92 mounted in the chamber coaxially of the apertures 86 and 88 which are circular in shape. Mounted in these bearings is a gear hub 93 carrying an annular worm gear 94 which is in driving relationship to a worm 95 which, although it is not shown, is attached to a long handle with a crank at the end of it for actuation from a distance from the mill. A universal joint in the handle would permit actuation from the mill floor if the installation were made on a vertical mill. Mounted in a bore 96 in the hub 93 is a socket 97 which, although it is capable of axial motion within the bore, is prevented from rotating by means of a key 98, the socket being resiliently biased to the left by a coil spring 99. The socket is internally formed in a hexagonal shape to fit the hexagonal surface 78 of the jackshaft 73, and to provide for the adjustment of the roll in the manner described above.

It will be understood that once the pressure against the outer races of the thrust bearing is produced during initial assembly by manipulation of the third and fourth adjusting members 51 and 52, the operator of the mill will have no control over this pressure. His only access to the machinery will be by actuation of the jackshaft 73 and this will produce only axial movement of the roll. Actuation of the mill screwdown will produce no stresses within the bearing and its allied elements because the screwdown pressure will be transmitted to the mill housing through the chock 28 only, and will not be felt by the adjusting apparatus or the thrust bearings.

It is obvious that minor changes may be made in the form of construction of the invention without departing from the material spirit thereof. It is not, however, desired to confine the invention to the exact form herein shown and described, but it is desired to include all such as properly come within the scope claimed.

The invention having thus been described, what is claimed as new and desired to secure by Letters Patent is:

1. A bearing apparatus having a radial bearing and a thrust bearing, comprising a chock in which the bearings reside, a first adjusting member fixed in the chock at one side of the thrust bearing, a second adjusting member fixed in the chock at the other side of the thrust bearing, a third adjusting member having a surface contacting the said one side of the thrust bearing and threadedly engaging the said first adjusting member, and means rotating the third adjusting member to produce axial movement of the thrust bearing.

2. A bearing apparatus having a radial bearing and a thrust bearing, comprising a chock in which the bearings reside, a first adjusting member fixed in the chock at one side of the thrust bearing, a second adjusting member fixed in the chock at the other side of the thrust bearing, a third adjusting member having a surface contacting the said one side of the thrust bearing and threadedly engaging the said first adjusting member, a fourth adjusting member having a surface contacting the said other side of the thrust bearing and threadedly engaging the said second adjusting member, and means for simultaneously rotating the third and fourth adjusting members to produce axial movement of the thrust bearing.

3. A bearing apparatus having a radial bearing and a thrust bearing, comprising a chock in which the bearings reside, a first adjusting member normally fixed in the chock at one side of the thrust bearing, a second adjusting member normally fixed in the chock at the other side of the thrust bearing, a third adjusting member having a radial surface contacting the said one side of the thrust bearing and threadedly engaging the said first adjusting member, a fourth adjusting member having a radial surface contacting the said other side of the thrust bearing and threadedly engaging the said second adjusting member, and means for simultaneously rotating the third and fourth adjusting members to produce axial movement of the thrust bearing.

4. A bearing apparatus having a radial bearing and a thrust bearing, a chock in which the bearings reside, the thrust bearing having an inner race and an outer race havin goppositely facing radial surfaces, a first adjusting member normally fixed in the chock at one side of the thrust bearing, a second adjusting member normally fixed in the chock at the other side of the thrust bearing, a third adjusting member having a radial surface contacting the radial surface at the said one side of the thrust bearing and threadedly engaging the said first adjusting member, a fourth adjusting member having a radial surface contacting the radial surface at the said other side of the thrust bearing and threadedly engaging the said second adjusting member, and means for simultaneously rotating the third and four adjusting members to produce axial movement of the thrust bearing.

5. A bearing apparatus having a radial bearing and a thrust bearing, comprising a chock in which the bearings reside, a first adjusting member normally fixed in the chock at one side of the thrust bearing, a second adjusting member normally fixed in the chock at the other side of the thrust bearing, a third adjusting member contacting the said one side of the thrust bearing and threadedly engaging the said first adjusting member, a fourth adjusting member contacting the said other side of the thrust bearing and threadedly engaging the said second adjusting member, the third and fourth adjusting members having gear teeth formed on adjacent parts thereof, and a gear meshing with the said teeth for simultaneously rotating the third and fourth adjusting members to produce axial movement of the thrust bearing.

6. A bearing apparatus comprising a thrust bearing, a chock in which the bearing resides, the bearing having an inner race fixed to the roll neck and an outer race having oppositely-facing radial surfaces, a first adjusting member normally fixed in the chock at one side of the bearing, a second adjusting member normally fixed in the chock at the other side of the bearing, a third adjusting member contacting a radial surface at one side of the bearing and threadedly engaging the said first adjusting member, a fourth adjusting member contacting the radial surface of the said other side of the bearing and threadedly engaging the second adjusting member, the third and fourth adjusting members having gear teeth formed on adjacent portions thereof, and a gear meshing with the said teeth for simultaneously rotating the third and fourth adjusting members to produce axial movement of the bearing.

7. A bearing apparatus, comprising a chock, an oil film bearing having a sleeve and a bushing mounted in the chock, a thrust bearing mounted in the chock having an outer race on either axial side thereof, a first adjusting member fixed in the chock adjacent the thrust bearing, a second adjusting member having a surface contacting the said thrust bearing and threadably engaging the said first adjusting member, means rotating the second adjusting member to produce axial movement of the thrust bearing and the sleeve, and means associated with the adjusting members to remove all backlash from the threaded engagement between them, the second adjusting member embracing the outer races of the thrust bearing to bring about a selected preloading of the bearing.

References Cited in the file of this patent

UNITED STATES PATENTS

| | | |
|---|---|---|
| 933,627 | Courtney | Sept. 7, 1909 |
| 1,089,671 | Rice et al. | Mar. 10, 1914 |
| 2,018,055 | Dahlstrom | Oct. 22, 1935 |
| 2,064,453 | Wheeler | Dec. 15, 1936 |
| 2,155,747 | Wood | Apr. 25, 1939 |
| 2,326,180 | Stempel | Aug. 10, 1943 |
| 2,597,161 | Megaletial | May 20, 1952 |
| 2,674,140 | Eger | Apr. 6, 1954 |